United States Patent
Chow et al.

(10) Patent No.: US 11,066,283 B2
(45) Date of Patent: Jul. 20, 2021

(54) SUSPENSION SYSTEM FOR AN AUTOMATED GUIDE VEHICLE

(71) Applicant: Logistics and Supply Chain MultiTech R&D Centre Limited, Pok Fu Lam (HK)

(72) Inventors: Wing Leung Chow, Pok Fu Lam (HK); Lu Sze Wai, Pok Fu Lam (HK); Yuan Li Yin, Pok Fu Lam (HK); Tsz Hin Wong, Pok Fu Lam (HK)

(73) Assignee: Logistics and Supply Chain Multitech R&D Centre Limited, Pok Fu Lam (HK)

( * ) Notice: Subject to any disclaimer, the term of this patent is extended or adjusted under 35 U.S.C. 154(b) by 82 days.

(21) Appl. No.: 16/229,032

(22) Filed: Dec. 21, 2018

(65) Prior Publication Data

US 2020/0198947 A1    Jun. 25, 2020

(51) Int. Cl.
| | | |
|---|---|---|
| *B66F 9/06* | (2006.01) | |
| *B66F 9/075* | (2006.01) | |
| *B65G 1/04* | (2006.01) | |
| *B66F 9/24* | (2006.01) | |

(52) U.S. Cl.
CPC ............ *B66F 9/063* (2013.01); *B65G 1/0492* (2013.01); *B66F 9/0755* (2013.01); *B66F 9/24* (2013.01); *G05D 2201/0216* (2013.01)

(58) Field of Classification Search
CPC .......... B66F 9/063; B66F 9/0755; B66F 9/24; B65G 1/0492; G05D 2201/0216; B60G 9/02; B60G 2300/24
See application file for complete search history.

(56) References Cited

U.S. PATENT DOCUMENTS

| | | | | |
|---|---|---|---|---|
| 3,504,928 | A * | 4/1970 | Reimer | B60G 9/02 |
| | | | | 280/104 |
| 4,529,052 | A * | 7/1985 | Imai | B62D 9/00 |
| | | | | 180/23 |
| 6,206,119 | B1 * | 3/2001 | Wu | A61G 5/043 |
| | | | | 180/24.02 |
| 6,217,047 | B1 * | 4/2001 | Heyring | B60G 9/02 |
| | | | | 280/124.106 |
| 2003/0205878 | A1 * | 11/2003 | Martis | B60G 11/16 |
| | | | | 280/124.111 |
| 2016/0167706 | A1 * | 6/2016 | Van Meijl | B60W 10/08 |
| | | | | 701/41 |
| 2016/0209847 | A1 * | 7/2016 | Kuegle | G05D 1/0276 |
| 2017/0080846 | A1 * | 3/2017 | Lord | B60K 17/00 |
| 2017/0129297 | A1 * | 5/2017 | Bjorn | B60L 15/20 |
| 2018/0099811 | A1 * | 4/2018 | Shen | B66F 3/08 |

* cited by examiner

*Primary Examiner* — Frank B Vanaman

(74) *Attorney, Agent, or Firm* — Renner, Kenner, Greive, Bobak, Taylor & Weber

(57) ABSTRACT

A system and a method for an automated guided vehicle for transporting one or more objects, the automated guided vehicle including a chassis; a suspension system, the suspension system including a first arm coupled to the chassis via a first coupling and a second arm coupled to the chassis via a second coupling; the first arm pivotable relative to the chassis and about a first pivot axis; the second arm pivotable relative to the chassis and about a second pivot axis; one or more first movement structures associated with the first arm; one or more second movement structures associated with the second arm; the second arm arranged transverse relative to the first arm, the first pivot axis and second pivot axis are transverse to each other.

29 Claims, 5 Drawing Sheets

SUSPENSION SYSTEM FOR AN AUTOMATED GUIDE VEHICLE

TECHNICAL FIELD

The present disclosure relates to a suspension system for an automated guided vehicle (AGV).

BACKGROUND

Warehousing is becoming increasingly popular especially with the increasing popularity of online shopping and delivery of goods. Warehouses are an example of an indoor environment where automated guided vehicles are commonly used. An automated guided vehicle (AGV) is a mobile robot or mobile vehicle that is used in a warehouse for various functions such as moving shelving racks or moving goods between shelves or stacking goods etc. AGVs are also used to transport other objects such as boxes or goods around an environment e.g. around a warehouse. Often multiple AGVs are used in an indoor environment e.g. in a warehouse. Environments AGVs are used in can be uneven and have uneven surface, such as for example an uneven floor in a warehouse. AGVs include suspension systems that attempt to adapt to uneven surfaces. Current suspension systems still cause unstable movement in some situations and can cause instability of the AGV during acceleration and deceleration.

SUMMARY OF THE INVENTION

It is an object of the present invention to provide a suspension system for an automated guided vehicle (AGV) that assists in levelling the AGV or provide the public with a useful alternative.

Other objects of the invention (or inventions) may become apparent from the following description and drawings, which is given by way of example only.

The present disclosure relates to a suspension system for an automated guided vehicle that enhances stability of a load supported by the automated guided vehicle (AGV). The suspension system decouples the wheels or other movement structures of the AGV from the load supported by the AGV such that the load is held substantially level and/or stable.

In accordance with a first aspect the present invention relates to an automated guided vehicle for transporting one or more objects, the automated guided vehicle comprising:
a chassis;
a suspension system, the suspension system comprising a first arm coupled to the chassis via a first coupling and a second arm coupled to the chassis via a second coupling;
the first arm pivotable relative to the chassis and about a first pivot axis;
the second arm pivotable relative to the chassis and about a second pivot axis;
one or more first movement structures associated with the first arm;
one or more second movement structures associated with the second arm;
the second arm arranged transverse relative to the first arm, the first pivot axis and second pivot axis are transverse to each other.

In an embodiment the first pivot axis passes through the first coupling and the second pivot axis passes through the second coupling.

In an embodiment the chassis includes a longitudinal axis and a transverse axis, the first arm arranged parallel to the longitudinal axis and the second arm arranged parallel to the transverse axis.

In an embodiment the first arm includes a drive wheel and a guiding wheel, the drive wheel and the guiding wheel is attached to the first arm, the drive wheel providing a drive force to propel the AGV and the guiding wheel being rotatably attached to the first arm such that the guiding wheel can rotate relative to the first arm and/or relative to the chassis to assist the AGV in steering or turning.

In an embodiment the chassis comprises a drive assembly, the drive assembly comprising an actuator that is coupled to the drive wheel to provide the drive force to the drive wheel to propel the AGV.

In an embodiment the second arm comprises one or more guiding wheels attached to the second arm.

In an embodiment the guiding wheel attached to the first arm comprises a caster wheel.

In an embodiment the one or more guiding wheels attached to the second arm comprise a caster wheel.

In an embodiment suspension system comprises a pair of first arms and a single second arm, the pair of first arms being spaced apart from each other and coupled to the chassis on opposing sides of the chassis, the second arm coupled to an end of the chassis, and wherein the pair of first arms arranged parallel to the longitudinal axis and the second arm arranged parallel to the transverse axis.

In an embodiment the chassis comprising a plurality of members, the members are attached together to form a skeleton and the skeleton defining the chassis.

In an embodiment each first arm and second arm comprises a solid and unitary structure.

In an embodiment the chassis comprises a platform, the platform being disposed on the chassis in a stable and/or planar orientation, the first arm and second arm pivoting in response to the AGV travelling over uneven surfaces to retain the platform in a substantially stable and/or planar orientation.

In accordance with a second aspect the present invention relates to an autonomous guided vehicle (AGV), the automated guided vehicle (AGV) comprising:
a chassis;
a suspension system coupled to the chassis, the suspension system comprising;
a longitudinal arm pivotably connected to the chassis;
a transverse arm pivotably connected to the chassis;
the longitudinal arm pivotable in a first pivoting plane relative to the chassis, the transverse arm pivotable in a second pivoting plane relative to the chassis; and
wherein the first pivoting plane is perpendicular to the second pivoting plane.

In an embodiment the transverse arm arranged crosswise to the longitudinal arm on the chassis, and the longitudinal arm being spaced away from the transverse arm.

In an embodiment longitudinal arm pivots about a first pivot axis and the transverse arm pivots about a second pivot axis and the first pivot axis is perpendicular to the second pivot axis.

In an embodiment the suspension system comprises a pair of longitudinal arms and a single transverse arm, a first longitudinal arm is attached to a first side of the chassis and a second longitudinal arm is attached to an opposing side of the chassis and the transverse arm attached to an end of the chassis, wherein the end is perpendicular to the side.

In an embodiment the chassis comprises a plurality of frame members, at least one frame member defining a first side of the chassis, another frame member defining a second side of the chassis, a further frame member defining the end of the chassis.

In an embodiment each arm is coupled to one of the frame members and pivotable relative to the frame member that the arm is coupled to.

In an embodiment each longitudinal arm comprises a drive wheel and a guiding wheel and the transverse arm comprises two guiding wheels.

In an embodiment the guiding wheels are spaced apart from each other on the transverse arm, and the drive wheel and guiding wheel are spaced apart from each other on each longitudinal arm.

In an embodiment each guiding wheel comprises a caster and wheel assembly such that each guiding wheel can rotate relative to each arm and each guiding wheel being independently rotatable.

In an embodiment each longitudinal arm is attached to the chassis by a coupling, wherein each longitudinal arm is pivotable about the coupling, and the transverse arm is attached to the chassis by a coupling, wherein the transverse arm is pivotable about the coupling.

In an embodiment the AGV comprises a load supporting structure carried by the chassis, the suspension system configured to decouple the load supporting structure and/or the chassis from the arms such that position and/or orientation of the load supporting structure is substantially unchanged in response to movement of one or more of the arms.

In an embodiment the suspension system is configured to decouple the chassis from the arms such the center of gravity of the AGV remains stable even when the arms pivot as the AGV moves across an uneven surface.

In accordance with a further aspect the present invention broadly relates to a suspension system for use with an AGV, the suspension system comprising:
a pair of longitudinal arms that are configured to be pivotably attached to a chassis of the AGV;
a transverse arm configured to be pivotably attached to the chassis of the AGV;
the longitudinal arms being arranged parallel to each other;
the longitudinal arms are pivotable about a first pivot axis, the transverse arm pivotable about a second pivot axis and the second pivot axis is perpendicular to the first pivot axis.

In an embodiment the longitudinal arms pivot in a first plane, the transverse arm pivots in a second plane and wherein the first plane is perpendicular to the second plane.

In an embodiment the longitudinal arms and the transverse arm each pivot in a rocking motion.

In an embodiment each longitudinal arms comprise a drive wheel and a guiding wheel.

In an embodiment each guiding wheel comprises a wheel and caster assembly such that each guiding wheel is independently rotatable.

In an embodiment each arm is configured to independently move or pivot relative to the chassis.

In an embodiment the suspension system is configured to decouple the chassis from the arms, each arm independently moveable or pivotable relative to the chassis such that the center of gravity of the AGV is stable or remains substantially unchanged.

In an embodiment the longitudinal arms are configured to absorb pitch motion of the AGV and the transverse arm is configured to absorb roll motion of the AGV.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

The term AGV as used herein means an automated guided vehicle that can automatically move around an environment.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example circuits, etc., may be shown in block diagrams in order not to obscure the embodiments in unnecessary detail. In other instances, well-known modules, structures and techniques may not be shown in detail in order not to obscure the embodiments.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, system, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which.

DETAILED DESCRIPTION OF A PREFERRED EMBODIMENT

Figure 1:
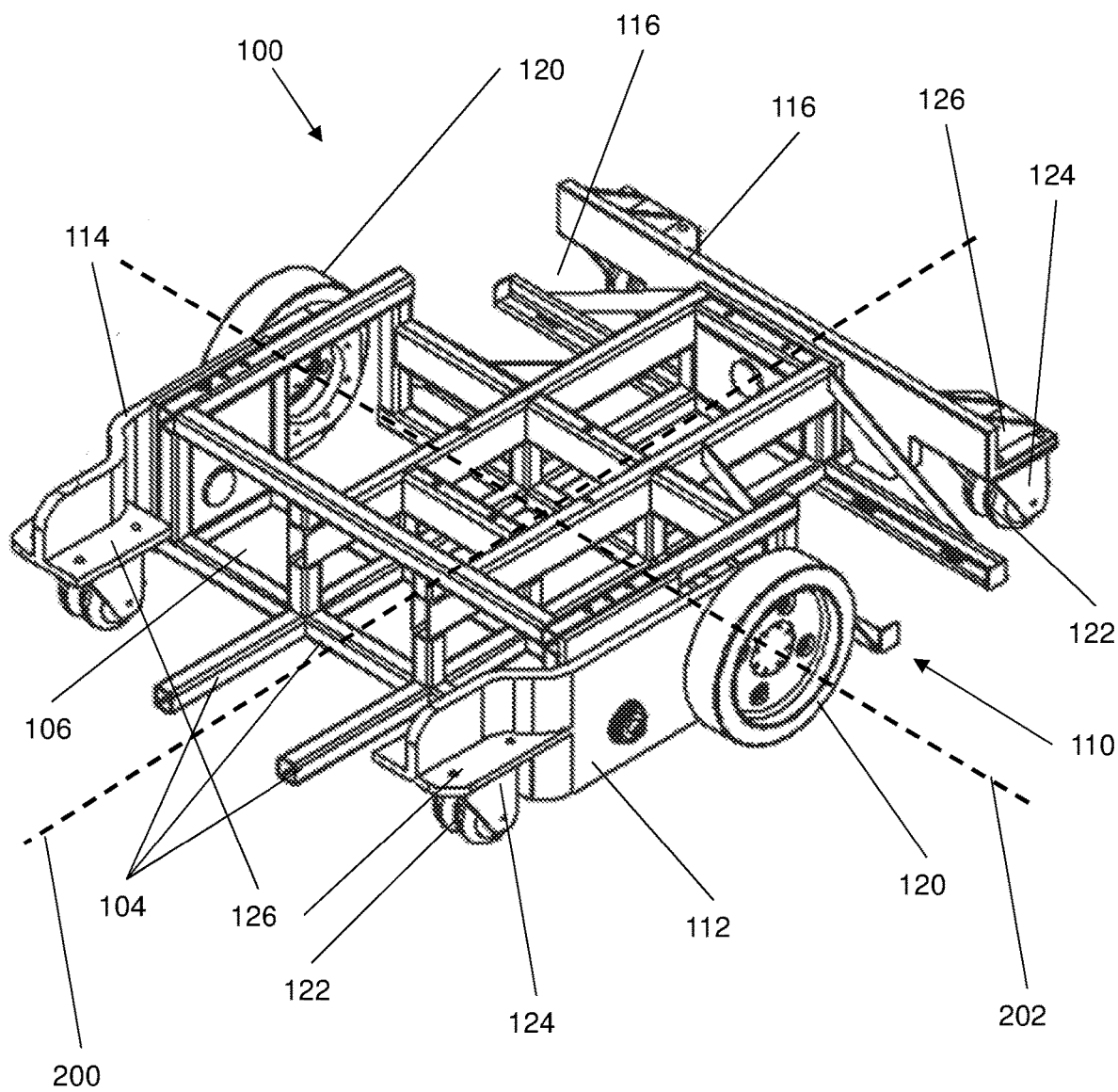
FIG. 1 shows an isometric view of an example embodiment of an automated guided vehicle (AGV) that includes a suspension system that stabilizes the AGV.

Automated guided vehicles (AGVs) are becoming more commonplace across several industries for various applications. Automated guided vehicles (AGVs) are often used for materials handling tasks within factories or warehouses or other environments. Some example uses of AGVs are for moving shelving racks or moving goods or moving boxes/containers around a warehouse or factory. AGVs generally include a lifting apparatus such as a platform or a lifting arm or tines such as a forklift. Loads (e.g. boxes, shelving racks etc.) are supported by the lifting apparatus.

Often multiple AGVs are used in an indoor environment e.g. in a warehouse. Due to space constraints in an indoor environment there is always a risk of collisions between AGVs in an indoor environment and/or collisions between the AGVs and other objects within an indoor environment. AGVs can utilise any known guidance protocol (i.e. guidance methodology). For example the environment may include waypoints or markers positioned along the floor of the environment or the AGV may include a stored map that is used by the AGV to navigate itself around an environment (e.g. a warehouse or factory).

Most autonomous guided vehicles (AGVs) available today are usually equipped with a suspension system to adapt to uneven surfaces as the AGV moves around an environment. One common problem with commonly used suspension systems are squat and nose dive that occurs during acceleration and deceleration, respectively of the AGV. If the AGV is carrying loads, especially heavy loads, acceleration and deceleration of the AGV can lead to excess body lean and/or a roll or pitch motion about either an axis. This can lead to instability of the AGV and also causes instability of the load. The instability can cause the load to fall off the AGV and get damaged or potentially cause the AGV to fall and get damaged.

The present disclosure is directed to a suspension system for an AGV and an AGV that incorporates a suspension system that improves stability of the AGV. The suspension system is configured to decouple the AGV from its movement structures e.g. wheels from the chassis such that the chassis remains substantially stable as the AGV moves. The suspension system is configured to stabilise the chassis as the AGV moves over uneven surfaces. The suspension system absorbs impulses due to uneven surfaces or acceleration/deceleration of the AGV such that these impulses are isolated from the chassis. The chassis is held substantially level i.e. stable even when the AGV is exposed to impulses. The suspension system helps to keep loads supported by the AGV e.g. by the chassis substantially stable. The suspension system helps to prevent movement of the loads supported by the AGV in response to impulses. The suspension system is configured to hold the load in a substantially flat or planar orientation in response to impulses or forces as the AGV travels over uneven surfaces.

In one example configuration the suspension system comprises a pair of longitudinal arms that are configured to be pivotably attached to a chassis of the AGV; a transverse arm configured to be pivotably attached to the chassis of the AGV; the longitudinal arms being arranged parallel to each other; and the longitudinal arms are pivotable about a first pivot axis, the transverse arm pivotable about a second pivot axis and the second pivot axis is perpendicular to the first pivot axis. The longitudinal arms pivot in a first plane, the transverse arm pivots in a second plane and wherein the first plane is perpendicular to the second plane. The longitudinal arms and the transverse arm each pivot in a rocking motion. The longitudinal arms and the transverse arms are substantially unitary structures and each include a single arm.

In another form the present disclosure relates to an automated guided vehicle (AGV), the automated guided vehicle (AGV) comprises: a chassis; a suspension system coupled to the chassis, the suspension system comprising; a longitudinal arm pivotably connected to the chassis; a transverse arm pivotably connected to the chassis; the longitudinal arm pivoting in a first pivoting plane, the transverse arm pivoting in a second pivoting plane and wherein the first pivoting plane is perpendicular to the second pivoting plane. The transverse arm is arranged substantially crosswise (i.e. in a substantially perpendicular) to the longitudinal arm on the chassis and the longitudinal arm being spaced away from the transverse arm. The longitudinal arm pivots about a first pivot axis and the transverse arm pivots about a second pivot axis and the first pivot axis is perpendicular to the second pivot axis. Optionally the suspension system comprises a pair of longitudinal arms and a single transverse arm, a first longitudinal arm is attached to a first side of the chassis and a second longitudinal arm is attached to an opposing side of the chassis and the transverse arm attached to an end of the chassis, wherein the end is perpendicular to the side.

The longitudinal arms may include at least one drive wheel disposed on each longitudinal arm and at least one guiding wheel disposed on each longitudinal arm. In these examples, the guiding wheels may be implemented by use of caster wheels or any other type of wheel members that preferably supports loads placed upon it. The guiding wheels may or may not be powered, although in a prefer embodiment where the guiding wheels are caster wheels, then such wheel members would not be powered but merely supports a load.

A pair of guiding wheels are disposed on the transverse arm. The drive wheels are used to propel the AGV and the guiding wheels allow the AGV to be steered. The guiding wheels are rotatable and may be rotatable in 360 degrees.

In a further form the present disclosure relates to an automated guided vehicle (AGV) that includes a suspension system, the AGV comprises: a chassis; a suspension system, the suspension system comprising a first arm coupled to the chassis via a first coupling and a second arm coupled to the chassis via a second coupling; the first arm pivotable relative to the chassis and about a first pivot axis; the second arm pivotable relative to the chassis and about a second pivot axis; one or more first movement structures associated with the first arm; one or more second movement structures associated with the second arm; the second arm arranged transverse relative to the first arm, the first pivot axis and second pivot axis are transverse to each other.

In this form the first pivot axis passes through the first coupling and the second pivot axis passes through the second coupling. The chassis includes a longitudinal axis and a transverse axis, the first arm arranged parallel to the longitudinal axis and the second arm arranged parallel to the transverse axis. The first arm includes a drive wheel and a guiding wheel, the drive wheel and the guiding wheel is attached to the first arm, the drive wheel providing a drive force to propel the AGV and the guiding wheel being rotatably attached to the first arm such that the guiding wheel can rotate relative to the first arm and/or relative to the chassis to assist the AGV in steering or turning. The chassis comprises a drive assembly, the drive assembly comprising an actuator that is coupled to the drive wheel to provide the drive force to the drive wheel to propel the AGV. The second arm comprises one or more guiding wheels attached to the second arm.

Figure 2:
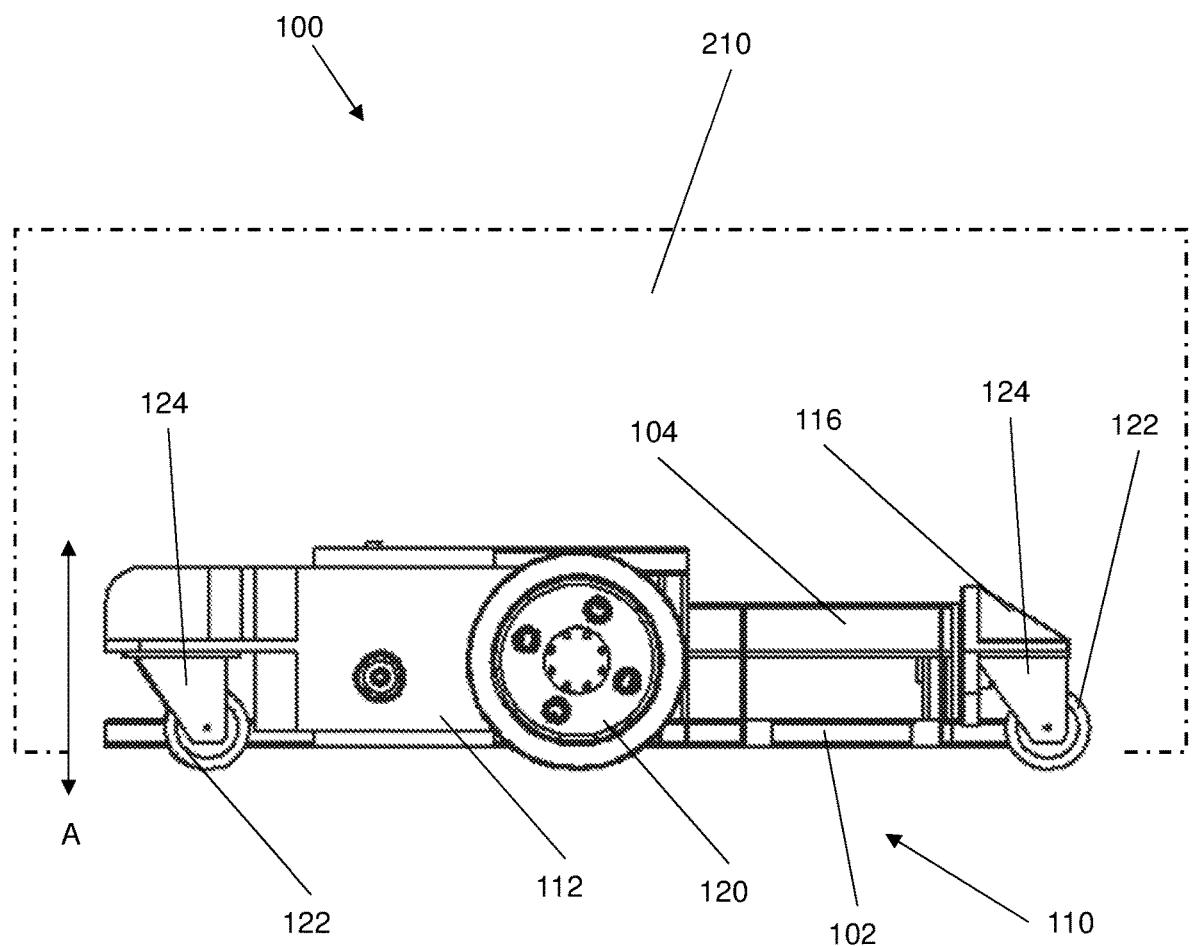
FIG. 2 shows a side view of the AGV of FIG. 1.
Figure 3:
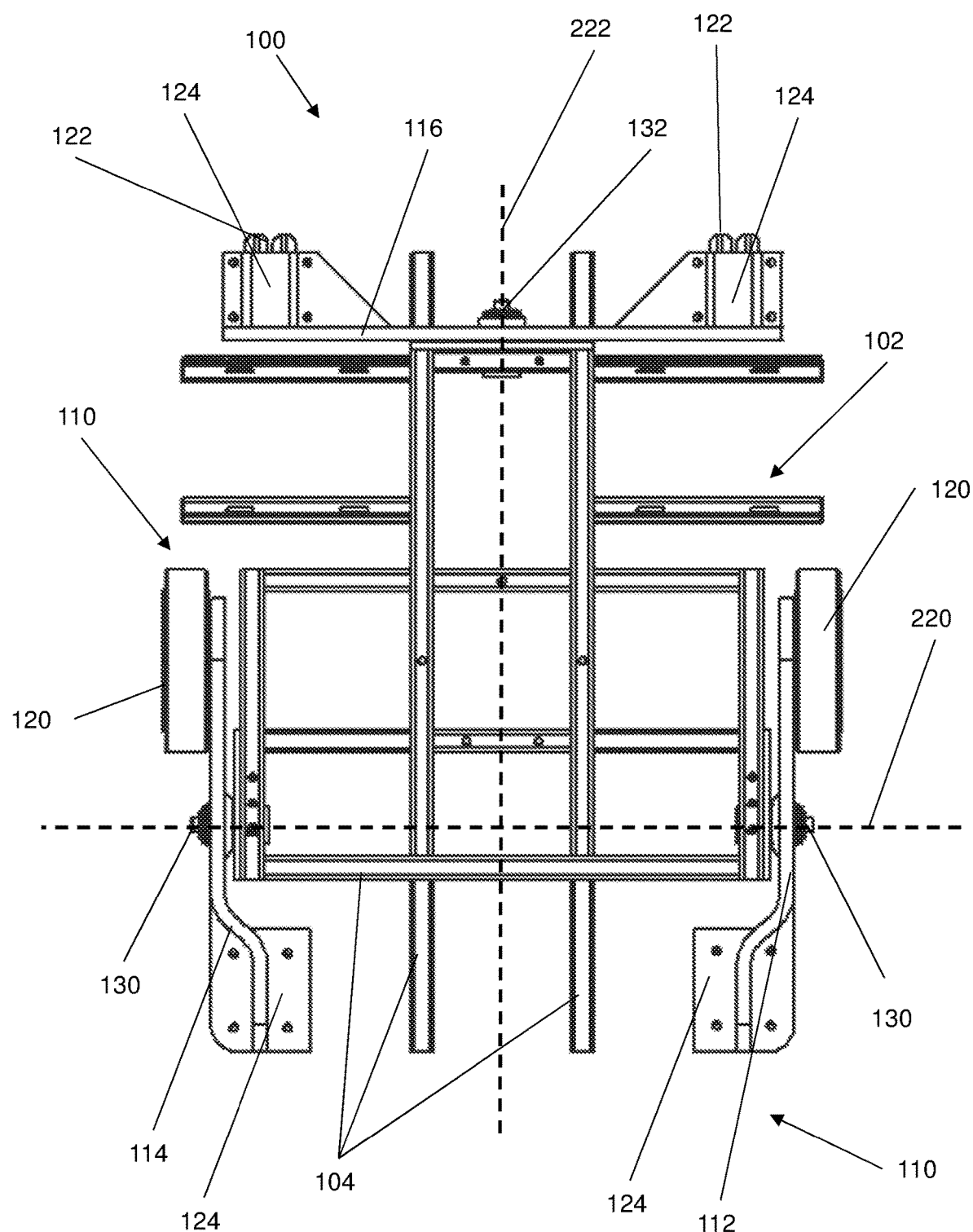
FIG. 3 shows a plan view i.e. a top view of the AGV of FIG. 1.
Figure 4:
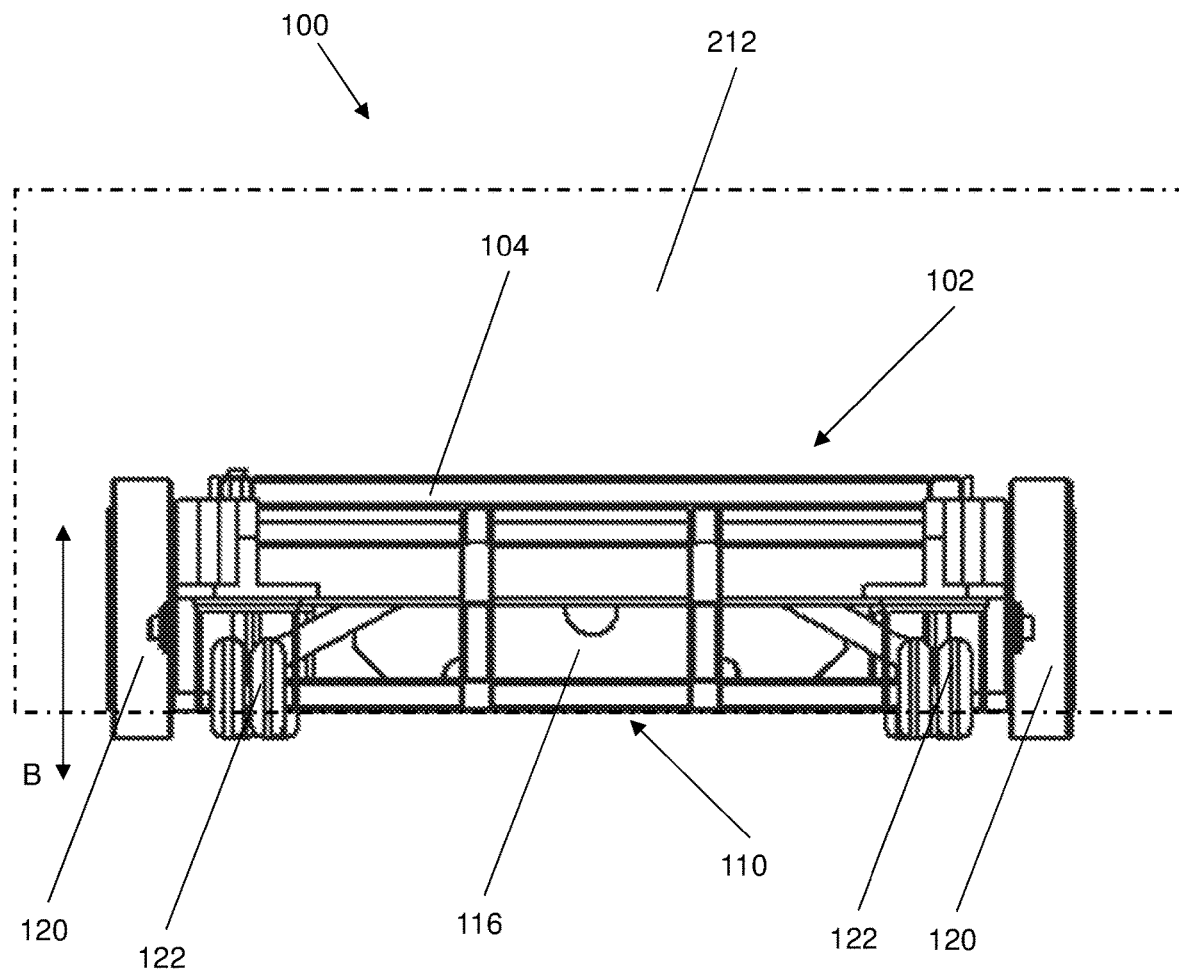
FIG. 4 shows an end view (i.e. a front view) of the AGV of FIG. 1.

Example embodiments will be described with reference to the attached figures. FIGS. 1 to 4 show an example embodiment of an automated guided vehicle (AGV) 100 that includes a suspension system 110. FIG. 1 shows an isometric view of the AGV. FIG. 2 shows a side view of the AGV. FIG. 3 shows a plan view i.e. a top view of the AGV and FIG. 4 shows an end view (specifically a front view) of the AGV.

The suspension system 110 is adapted to improve stability of the automated guided vehicle (AGV) as the AGV travels over uneven surfaces. The suspension system 110 is further adapted to improve traction. The suspension system 110 is configured to maintain the chassis in a stable arrangement such that loads supported by the chassis 102 (i.e. by the AGV) are held in a stable orientation e.g. the loads are held in place with minimal movement and the loads don't fall off the AGV 100.

As shown in FIG. 1 the chassis 102 comprises a plurality of members 104. The members are arranged and coupled together to form a skeleton frame. The arrangement of the skeleton frame includes gaps or spaces 106 between the various frame members 104 in order to reduce the overall mass of the chassis while still providing rigidity, robustness and a structure to the chassis 102. The members 104 are substantially rigid to provide a structure for the chassis 102. The members 104 may be formed of a rigid material such as for example a metal e.g. stainless steel or aluminium or another suitable metal.

Alternatively the members 104 may be made of a rigid polymer material such as a thermoplastic or thermoset or a rubberized material. For example the members may be made of polycarbonate or silicone or halogenated plastics or acrylics or any suitable rigid polymer. The chassis 102 may comprise members 104 formed from a combination of metal and polymer materials or metal alloys.

In the illustrated configuration of FIG. 1 the chassis 102 comprises a rectangular shape. The members 104 are interconnected to form the rectangular shape (i.e. rectangular profile). The rectangular profile is defined when viewed from above the chassis 102, i.e. when the chassis 102 is viewed in plan. FIG. 2 shows a plan view (i.e. top view) Alternatively the chassis 102 may comprise other shapes e.g. a polygon such as for example a square or a trapezium or a parallelogram or any other predetermined shape.

The AGV 100 comprises a drive assembly (not shown) that is disposed on the chassis. The drive assembly comprises a propulsion unit e.g. an electric motor. The drive assembly also comprises additional components that are configured to transmit propulsion forces generated by the propulsion unit.

The AGV 100 comprises one or more drive wheels 120 disposed on the chassis 102. The drive wheel is mechanically coupled to the propulsion unit in order to drive the drive wheel to propel the AGV forward or backward. The propulsion unit includes a controller that is adapted to control the propulsion unit to cause the AGV to accelerate or decelerate or maintain a constant speed or stop. The AGV 100 also comprises one or more steering mechanisms that are configured to allow the AGV to steer around an environment e.g. a warehouse. The steering elements may be controlled by the controller or may be passive steering elements.

As shown in FIGS. 1 to 4 the suspension system 110 comprises a pair of longitudinal arms 112, 114 (i.e. a pair of first arms) and a transverse arm 116 (i.e. a second arm). In the illustrated embodiment the suspension system 110 comprises a single transverse arm 116. Alternatively the suspension system 110 may comprises a plurality of transverse arms. The plurality of transverse arms are preferably arranged parallel to each other. The longitudinal arms 112, 114 and the transverse arm 116 are pivotable relative to the chassis 102.

The suspension system 110 is configured to decouple the chassis from the arms such that the chassis is held substantially stable in response to any loads or impulses due to the AGV travelling over uneven surfaces. The suspension system 110 is configured to stabilise the chassis and allow the AGV to move over uneven surfaces while causing minimal disturbance to the chassis. The suspension system 110 is further configured to absorb forces or impulses as the AGV travels around an environment. This is advantageous because any objects e.g. shelves or boxes supported by the chassis are held stable as the AGV moves.

The longitudinal arms 112, 114 and the transverse arm 116 are disposed on the chassis. Each of the longitudinal arms 112, 114 and the transverse arm 116 are coupled to chassis. More specifically the longitudinal arms 112, 114 are connected to opposing sides of the chassis 102 and the transverse arm 116 is coupled to one end of the chassis 102. The transverse arm 116 is arranged crosswise to the longitudinal arms 112, 114. As seen in FIG. 3 the transverse arm 116 is arranged substantially perpendicular to the longitudinal arms 112, 114. The transverse arm 116 is spaced away from the longitudinal arms 112, 114.

As shown in FIGS. 1 to 4 a first longitudinal arm 112 is attached to a first side of the chassis, a second longitudinal arm 114 is attached to an opposing side of the chassis and the transverse arm 116 is attached to an end of the chassis. In the illustrated embodiment the transverse arm 116 is attached to a rear end of the chassis and is disposed at the rear of the AGV 100. The end (i.e. rear end) is perpendicular to the two sides of the chassis and extends between the two sides. Each arm 112, 114 and 116 is attached to a frame member of the chassis. The first longitudinal arm 112 is attached to a member that defines at least a portion of the first side of the chassis. The second longitudinal arm 114 is attached to a second frame member that defines at least a portion of the second side of the chassis and the transverse arm 116 is attached to a further frame member (i.e. rear frame member) that defines a portion of the end of the chassis 102.

The chassis 102 is substantially rectangular in shape as seen in FIG. 3. The chassis 102 comprises a longitudinal axis 200 and a transverse axis 202 as shown in FIG. 3. The longitudinal axis 200 and the transverse axis 202 pass through the centre of the chassis. The longitudinal axis 200 and the transverse axis 202 are perpendicular to each other. The longitudinal arms 112, 114 (i.e. first arms) are disposed parallel to the longitudinal axis 200 and the transverse arm 116 (i.e. second arm) is disposed parallel to the transverse axis 202.

Each arm 112, 114, 116 of the suspension system 110 is coupled to one of the frame members and is pivotable relative to the frame member that the arm is coupled to. Each longitudinal arm 112, 114 is pivotably coupled to the chassis 102. The transverse arm is pivotably coupled to the chassis 102. The longitudinal arms 112, 114 are pivotable in a first pivoting plane 210 relative to the chassis and the transverse arm 116 is pivotable in a second pivoting plane 212 relative to the chassis. The first pivoting plane is a longitudinal plane 210 and the second pivoting plane is a transverse plane 212.

FIGS. 2 and 4 show the first pivoting plane and the second pivoting plane respectively. FIG. 3 shows the first and second pivoting planes are lines when viewed in plan, and illustrates the perpendicular relationship between the first pivoting plane and the second pivoting plane. The first pivoting plane 210 (i.e. the longitudinal plane) is perpendicular to the second pivoting plane 212 (i.e. the transverse plane). The longitudinal arms 112, 114 pivot in a direction that is perpendicular to the transverse arm 116.

The longitudinal arms 112, 114 is configured to pivot about a first pivot axis 220 and the transverse arm 116 is configured pivot about a second axis 222. The first pivot axis 220 is perpendicular to the second axis 222. Each longitudinal arm 112, 114 is coupled to the chassis 102 by a first coupling 130 and the transverse arm 116 is coupled to the chassis 102 by a second coupling 132. Each of the arms 112, 114, 116 pivot about the respective coupling. Expressed another way the longitudinal arms 112, 114 pivot about the respective first couplings 130 and the transverse arm 116 pivots about the second coupling 132.

The longitudinal arms 112, 114 and the transverse arm 116 may be identical to each other in dimensions and material and mechanical properties. The first and second couplings 130, 132 may be identical in size and structure. The first and second couplings 130, 132 may be pins or bolts or an elongate coupling. The coupling may also include a bearing to allow the arms 112, 114, 116 to pivot or move relative to the chassis and pivot about the coupling. The coupling passes through each of the arms and is coupled to the chassis. The arms 112, 114, and 116 pivot in a rocking motion.

The first pivot axis 220 passes through the first couplings 130 and the second pivot axis 222 passes through the second coupling 132. FIG. 3 shows the first pivot axis 220 passes through the first couplings 130 and second pivot axis 222 passes through the second coupling 132. The first pivot axis 220 extends perpendicular to the first pivot plane 210. The second pivot axis 222 extends perpendicular to the second pivot plane 212. FIG. 2 shows arrows A that illustrate the pivoting motion of the longitudinal arms 112, 114 relative to chassis 102. FIG. 4 shows arrows B that illustrate the pivoting motion of the transverse arm 116 relative to the chassis 102.

Each longitudinal arm 112, 114 may comprise one or more drive wheels 120 disposed on each arm and one or more guiding wheels disposed on each arm. The transverse arm 116 may comprise one or more guiding wheels. In an alternative configuration the transverse arm may also comprise one or more drive wheels disposed on the arm 116. In the illustrated embodiment as shown in FIGS. 3 and 4 each longitudinal arm 112, 114 comprises a drive wheel disposed on each arm 112, 114. The drive wheel 120 and the guiding wheel 122 on the longitudinal arms are spaced apart from each other. As shown in FIG. 3 each transverse arm 116 comprises a pair of guiding wheels 122. Each guiding wheel is disposed at opposing ends of the transverse arm 116 and the guiding wheels 122 are spaced apart from each other.

The guiding wheels 122 are independently rotatable i.e. each guiding wheel can freely rotate. The guiding wheels 122 comprise a caster and wheel assembly. The caster 124 allows the wheel to freely rotate i.e. independently rotate. Each arm 112, 114 and 116 comprises a plurality of wheel mounts 126. The guiding wheels 122 are mounted on the wheel mounts. The guiding wheels 122 are rotatable relative to the wheel mounts. The drive wheel 120 receives an actuation force from the propulsion unit and exerts a drive force to propel the AGV 100.

Figure 5:
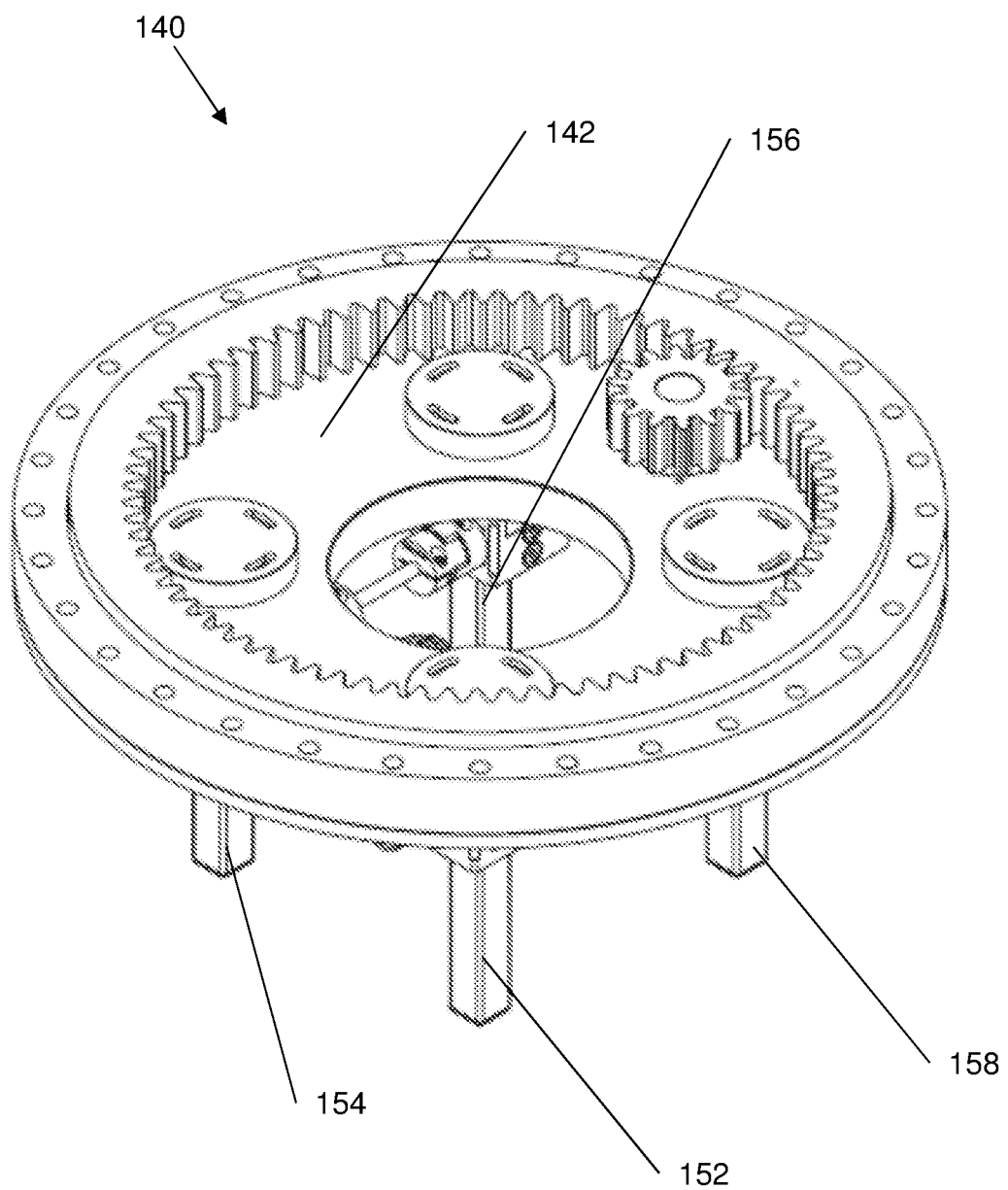
FIG. 5 shows an example embodiment of a load supporting structure for the AGV of FIG. 1.

The AGV 100 comprises a load supporting structure 140 carried by the chassis. FIG. 5 shows an example of a load supporting structure 140. The load supporting structure 140 comprises a platform 142 that is disposed on the chassis. The platform 140 is configured to support a load e.g. a shelf or boxes or goods. The load supporting structure 140 is mounted to the chassis 102 by a plurality of struts. As shown in FIG. 5, struts 152, 154, 156 and 158 mount the load support structure 140 onto the chassis. The load supporting structure 140 may include a plurality of jacks that can raise or lower the platform 142. The jacks may be synchronized to raise or lower the platform. The platform 142 may further be coupled to a rotation mechanism that is configured to rotate the platform 142.

The suspension system 110 is configured to decouple the load supporting structure and/or the chassis from the wheels via the arms 112, 114, 116. The platform 140 is decoupled from the wheels by the suspension system 110 such that the position and/or the orientation of platform 140 is substantially unchanged in response to movement of the AGV and/or in response to the movement of the arms.

The pivoting of the longitudinal arms 112, 114 and the transverse arm 116 causes any forces or loads acting on the wheels to be absorbed due to the pivoting motion. The pivoting of the arms 112, 114, 116 isolates the load supporting structure 140 from the wheels. The arms 112, 114 and 116 decouple the load supporting structure 140 (i.e. platform 140) from wheels. The suspension system 110 is configured to decouple the chassis 102 from the arms 112, 114, 116 such that the centre of gravity of the AGV remains stable even when the arms pivot as the AGV moves across an uneven surface. The AGV 100 moving across uneven surfaces causes the wheels to experience impulses (i.e. forces). The longitudinal arms 112, 114 and transverse arm 116 independently pivot in response to the impulses to absorb the impulses such that the platform 140 remains unaffected. The impulses are not transferred to the platform 140 due to the pivoting action of the arms 112, 114 and 116.

The suspension system 110 is configured to absorb pitch and roll motion the chassis may be exposed to. The chassis 102 may be exposed to pitch and roll motion as the AGV moves over uneven surfaces. Pitch motion is deflections or motion about the transverse axis of the AGV and roll motion is deflections or motion about the roll axis. Arrows P and R indicate pitch and roll respectively. The chassis may experience pitch and/or roll or a combination thereof as the AGV moves over uneven surfaces. The longitudinal arms are configured to absorb pitch motion of the AGV and the transverse arm is configured to absorb roll motion of the AGV. The pitch motion and roll motion being absorbed due to the arms moving in response to a force causing the pitch and/or roll motion. The suspension system 110 is configured to dynamically adjust to absorb forces and/or energy due to the AGV travelling across uneven surfaces.

An alternative embodiment of an AGV comprising an alternative embodiment of a suspension system will now be described. The AGV comprises a chassis. The chassis comprises a plurality of elongate members that are coupled together to define the chassis.

The chassis may be substantially rectangular in shape. Alternatively the chassis may comprise any other polygon shape such as for example a parallelogram or square or any other shape. The chassis may be formed from a rigid material e.g. a metal or a rigid plastic.

The AGV also comprises a drive assembly that is disposed on the chassis. The drive assembly comprises a propulsion unit e.g. an electric motor. The drive assembly also comprises additional components that are configured to transmit propulsion forces generated by the propulsion unit to propel the AGV.

The alternative AGV also comprises an alternative suspension system. The suspension system is configured decouple the chassis such that the chassis is isolated from forces or impulses acting on the AGV as the AGV moves across uneven surfaces. This alternative suspension system may also be configured to dynamically absorb forces and/or energy experienced by the AGV as the AGV travels over uneven surfaces. The alternative suspension system functions similar to the suspension system 110.

In this alternative suspension system comprises a first arm and a second arm, each being coupled to the chassis. The first arm is a longitudinal arm that is coupled to the chassis and arranged parallel to a longitudinal axis of the chassis. The second arm is a transverse arm that is arranged parallel to the transverse axis of the chassis. This alternative suspension system comprises a single longitudinal arm and a single transverse arm.

The longitudinal arm and the transverse arm are each pivotably coupled to the chassis by a coupling. The coupling may be pin or bolt or other suitable coupling. Each arm is configured to pivot relative to the chassis and about the coupling. The transverse arm is arranged substantially perpendicular to the longitudinal arm. Each arm is independently pivotable i.e. independently moveable. The arms pivot in response to forces acting on the chassis (and AGV) due to the AGV travelling over uneven surfaces. The pivoting (i.e. movement) of the arms absorbs the forces and decouples the chassis from the arms such that the chassis does not move or experience the forces.

The longitudinal arm is pivotable about a first pivot axis. The transverse arm is pivotable about a second pivot axis. The first pivot axis and second pivot axis are perpendicular to each other. The longitudinal arm and the transverse arm pivot perpendicular to each other.

The alternative embodiment of AGV also comprises a load supporting structure. The load supporting structure is a platform that is capable of supporting an object e.g. a shelf or box or other objects. The longitudinal arm (i.e. first arm) and transverse arm are configured to pivot as the AGV travels over uneven surfaces. The longitudinal arm and transverse arm independently pivot in response to forces experienced by the AGV as it travels over uneven surfaces in order to absorb the forces and prevent the platform (and chassis) from moving. The platform is held planar or stable as the AGV moves over uneven surfaces due to the pivoting of the arms. The alternative suspension system is configured to decouple the chassis from the wheels such that any forces or impulses experienced by the wheels are not transmitted to the chassis. The impulses or forces cause the arms (i.e. longitudinal and transverse arms) to pivot thereby absorbing the forces or impulses and preventing transmission to the chassis.

The suspension systems described herein comprise a modified rocker-bogie type arrangement. However, the suspension systems each use single, unitary arms with a single pivot rather than multiple pivots. The suspension systems do not require any springs or sub axles for each wheel. The use of the pivoting arms as the suspension system reduces and can eliminate squat and nose dive action during acceleration and deceleration of the AGV.

The independent pivoting action and independent pivoting ability of the arms allows the chassis to maintain the average pitch angle of at least the longitudinal arm while allowing the AGV to climb over obstacles. The independent pivoting of the arms also allows the AGV to move over uneven surfaces and climb obstacles while keeping all the wheels in contact with the ground thereby increasing overall stability of the AGV and improving traction. The suspension systems as described also allow the centre of gravity of the chassis (and the load supporting structure) to remain stable. The position and centre of gravity of the chassis and load supporting structure is not affected by squat, dive and roll movement since the pivoting of the arms absorb this motion.

The decoupling of the chassis and load supporting structure from the wheels, due to the suspension system assist in retaining objects or loads in a stable orientation as the AGV moves. The suspension systems reduce and/or eliminate instability due to uneven surfaces or due to squat and dive motion as the AGV accelerates and decelerates.

Some alternative configurations of the AGV components are described below. These configurations may be used in addition to or as an alternative to the components described above with respect to the figures. In an alternative configuration the chassis may comprise one or more plates that connected together to form a chassis in a predetermined shape e.g. a rectangle. The chassis in this alternative configuration multiple plates may be connected together. In a further alternative configuration, the chassis may comprise a solid piece of material e.g. a metal or a polymer material.

In an alternative configuration the AGV may comprise one or more movement structures other than wheels. The AGV comprises one or more propulsion movement structures and one or more steering structures. The propulsion movement structure may be a track or a wheel and track assembly. The steering structures may be incorporated as part of the movement structure. For example, the steering structures may be part of the tracks or track and wheel assembly. A single track or track and wheel assembly is attached to either side of the chassis, and each track is independently driveable. For example in order to turn the AGV one track may be moved in one direction and the other track is moved in the other direction to cause the AGV to turn.

In an alternative configuration the load supporting structure 140 may comprise lifting arms and a mechanism that is configured to raise and lower the lifting arms. In a further alternative configuration the load supporting structure may comprise a platform or plate disposed on an upper surface of the chassis and may include a vertical translation mechanism. The vertical translation mechanism is mechanically coupled to the platform to raise and lower the platform. For example the vertical translation mechanism may comprise a pulley system or a hydraulic lifting system or any other suitable system that is configured to raise and lower the platform.

In some embodiments the platform may include a lifting mechanism that comprises one or more jacks. The one or more jacks may be synchronized to raise or lower the platform. Further the platform may also include a rotating mechanism that is configured to rotate the platform. The rotation of the platform in combination with the suspension system, particularly the pivoting of the longitudinal arm(s) and transverse arm, helps to further hold the object stable when the AGV is exposed to impulses due to the AGV moving over uneven surfaces. The rotating platform can be rotated to reduce any centripetal forces the platform may be exposed to.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:

1. An automated guided vehicle for transporting one or more objects, the automated guided vehicle comprising:
a chassis;
a suspension system, the suspension system comprising a pair of first arms each coupled to the chassis via a first coupling, and a second arm coupled to the chassis via a second coupling, wherein the pair of first arms are independently pivotable relative to the chassis and about a first pivot axis, and the second arm is pivotable relative to the chassis and about a second pivot axis;
one or more first movement structures associated with the pair of first arms; and
one or more second movement structures associated with the second arm, wherein the second arm is arranged transverse relative to the pair of first arms, the first pivot axis and second pivot axis are transverse to each other, wherein each of the pair of first arms includes a drive wheel and a guiding wheel attached to and provided at opposite ends of the respective first arm;
wherein the chassis defines a longitudinal axis and a transverse axis, the pair of first arms are arranged parallel to the longitudinal axis, and the second arm is arranged parallel to the transverse axis; and
wherein the chassis is further arranged to maintain an average pitch angle of each of the pair of first arms by the independent pivoting action of the pair of first arms so as to improve stability and traction of the automated guided vehicle by keeping the drive wheel and the guiding wheel on the ground.

2. An automated guided vehicle in accordance with claim 1, wherein the first pivot axis passes through the first coupling and the second pivot axis passes through the second coupling.

3. An automated guided vehicle in accordance with claim 1, wherein the drive wheel of each of the pair of first arms is configured to provide a drive force to propel the AGV, and the guiding wheel is rotatably attached to each of the pair of first arms such that the guiding wheel can rotate relative to each of the pair of first arms and/or relative to the chassis to assist the AGV in steering or turning.

4. An automated guided vehicle in accordance with claim 1, wherein the second arm comprises one or more guiding wheels attached to the second arm.

5. An automated guided vehicle in accordance with claim 4, wherein the one or more guiding wheels attached to the second arm comprise a caster wheel.

6. An automated guided vehicle in accordance with claim 1, wherein the guiding wheel attached to each of the pair of first arms comprises a caster wheel.

7. An automated guided vehicle in accordance with claim 1, wherein the pair of first arms are spaced apart from each other and coupled to the chassis on opposing sides of the chassis, and the second arm is coupled to an end of the chassis.

8. An automated guided vehicle in accordance with claim 1, wherein the chassis comprising a plurality of members, the members are attached together to form a skeleton and the skeleton defining the chassis.

9. An automated guided vehicle in accordance with claim 1, wherein each first arm and second arm comprise a solid and unitary structure.

10. An automated guided vehicle in accordance with claim 1, wherein the chassis comprises a platform, the platform being disposed on the chassis in a stable and/or planar orientation, the pair of first arms and the second arm pivoting in response to the AGV travelling over uneven surfaces to retain the platform in a substantially stable and/or planar orientation.

11. An autonomous guided vehicle (AGV), the automated guided vehicle (AGV) comprising:
a chassis;
a suspension system coupled to the chassis, the suspension system comprising;
a pair of longitudinal arms, each being pivotably connected to the chassis;
a transverse arm pivotably connected to the chassis, wherein the pair of longitudinal arms are independently pivotable in a first pivoting plane relative to the chassis, the transverse arm is pivotable in a second pivoting plane relative to the chassis; and
wherein the first pivoting plane is perpendicular to the second pivoting plane;
wherein each of the longitudinal arms includes a drive wheel and a guiding wheel attached to and provided at opposite ends of the respective longitudinal arm;
wherein the chassis defines a longitudinal axis and a transverse axis, the pair of longitudinal arms are arranged parallel to the longitudinal axis, and the transverse arm is arranged parallel to the transverse axis; and
wherein the chassis is further arranged to maintain an average pitch angle of each of the pair of longitudinal arms by the independent pivoting action of the pair of longitudinal arms so as to improve stability and traction of the AGV by keeping the drive wheel and the guiding wheel on the ground.

12. An autonomous guided vehicle in accordance with claim 11, wherein the transverse arm is arranged crosswise to the pair of longitudinal arms on the chassis, and the pair of longitudinal arms are spaced away from the transverse arm.

13. An autonomous guided vehicle in accordance with claim 11, wherein the pair of longitudinal arms pivot about a first pivot axis and the transverse arm pivots about a second pivot axis and the first pivot axis is perpendicular to the second pivot axis.

14. An autonomous guided vehicle in accordance with claim 11, wherein the pair of longitudinal arms includes a first longitudinal arm attached to a first side of the chassis and a second longitudinal arm attached to an opposing side of the chassis and the transverse arm attached to an end of the chassis, wherein the end is perpendicular to the side.

15. An autonomous guided vehicle in accordance with claim 14, wherein the chassis comprises a plurality of frame members, at least one frame member defining a first side of the chassis, another frame member defining a second side of the chassis, a further frame member defining the end of the chassis.

16. An autonomous guided vehicle in accordance with claim 15, wherein each arm is independently coupled to one of the frame members and pivotable relative to the frame member that the arm is coupled to.

17. An autonomous guided vehicle in accordance with claim 14, wherein the transverse arm comprises two guiding wheels.

18. An autonomous guided vehicle in accordance with claim 17, wherein the guiding wheels are spaced apart from each other on the transverse arm, and the drive wheel and guiding wheel are spaced apart from each other on each longitudinal arm.

19. An autonomous guided vehicle in accordance with claim 17, wherein each guiding wheel comprises a caster and wheel assembly such that each guiding wheel can rotate relative to each arm and each guiding wheel being independently rotatable.

20. An autonomous guided vehicle in accordance with claim 17, wherein each longitudinal arm is independently attached to the chassis by a coupling, wherein each longitudinal arm is pivotable about the coupling, and the transverse arm is attached to the chassis by a coupling, wherein the transverse arm is pivotable about the coupling.

21. An autonomous guided vehicle in accordance with claim 11, wherein the AGV comprises a load supporting structure carried by the chassis, the suspension system configured to decouple the load supporting structure and/or the chassis from the arms such that position and/or orientation of the load supporting structure is substantially unchanged in response to movement of one or more of the arms.

22. An autonomous guided vehicle in accordance with claim 11, wherein the suspension system is configured to decouple the chassis from the arms such that the center of gravity of the AGV remains stable even when the arms pivot as the AGV moves across an uneven surface.

23. A suspension system for use with an AGV, the suspension system comprising:
- a pair of longitudinal arms that are configured to be independently and pivotably attached to a chassis of the AGV;
- a transverse arm configured to be pivotably attached to the chassis of the AGV;
- the longitudinal arms being arranged parallel to each other;
- the longitudinal arms are independently pivotable about a first pivot axis, the transverse arm pivotable about a second pivot axis and the second pivot axis is perpendicular to the first pivot axis;
- wherein each of the longitudinal arms includes a drive wheel and a guiding wheel attached to and provided at opposite ends of the respective longitudinal arm; and
- wherein the chassis is further arranged to maintain an average pitch angle of each of the pair of longitudinal arms by the independent pivoting action of the pair of longitudinal arms so as to improve stability and traction of the AGV by keeping the drive wheel and the guiding wheel on the ground.

24. A suspension system in accordance with claim 23, wherein the longitudinal arms pivot in a first plane, the transverse arm pivots in a second plane and wherein the first plane is perpendicular to the second plane.

25. A suspension system in accordance with claim 24, wherein the longitudinal arms and the transverse arm each pivot in a rocking motion.

26. A suspension system in accordance with claim 23, wherein each guiding wheel comprises a wheel and caster assembly such that each guiding wheel is independently rotatable.

27. A suspension system in accordance with claim 23, wherein each arm is configured to independently move or pivot relative to the chassis.

28. A suspension system in accordance with claim 23, wherein the suspension system is configured to decouple the chassis from the arms, each arm independently moveable or pivotable relative to the chassis such that the center of gravity of the AGV is stable or remains substantially unchanged.

29. A suspension system in accordance with claim 23, wherein the longitudinal arms are configured to absorb pitch motion of the AGV and the transverse arm is configured to absorb roll motion of the AGV.

* * * * *